United States Patent [19]
Felix et al.

[11] Patent Number: 4,821,511
[45] Date of Patent: Apr. 18, 1989

[54] LINER FOR A SOLID PROPELLANT ROCKET MOTOR

[75] Inventors: Bernard R. Felix, Saratoga; Stephen E. Slosarik, Los Gatos, both of Calif.

[73] Assignee: United Technologies Corporation, Hartford, Conn.

[21] Appl. No.: 925,645

[22] Filed: Oct. 31, 1986

[51] Int. Cl.⁴ .............................................. F02K 9/00
[52] U.S. Cl. ...................................... 60/255; 149/37; 424/4; 102/287; 102/289; 102/290
[58] Field of Search ...................... 60/253, 255, 270.1, 60/251; 102/287, 289, 290, 291; 264/40.2; 424/4

[56] References Cited

U.S. PATENT DOCUMENTS

| | | | |
|---|---|---|---|
| 3,765,177 | 10/1973 | Ritchey et al. | 60/253 |
| 3,855,176 | 12/1974 | Skidmore | 60/253 |
| 3,937,800 | 2/1976 | Dur-Smith et al. | 424/4 |
| 3,973,397 | 8/1976 | Chase et al. | 60/253 |
| 4,079,124 | 3/1978 | Winchell | 424/4 |
| 4,101,646 | 7/1978 | Sugimoto | 124/4 |

FOREIGN PATENT DOCUMENTS 1174031 12/1969 United Kingdom .

Primary Examiner—Donald P. Walsh

[57] ABSTRACT

A curable liner for a solid propellent rocket motor includes a radiopaque material uniformly blended therein to provide a sufficient density difference between the propellant and insulator to enhance non-destructive X-ray evaluation of the liner propellant interface. Up to 10% powdered tungsten is added to a liner component mixture prior to incorporation in a rocket motor. Utilizing this radiopaque material in the liner mixture allows detection of previously undetectable voids, disbands or flaws at the liner propellant interface, thereby reducing the potential for failure of the rocket motor during operation.

7 Claims, 1 Drawing Sheet

LINER FOR A SOLID PROPELLANT ROCKET MOTOR

TECHNICAL FIELD

This invention relates to solid propellant rocket motors and more particularly to a solid propellant rocket motor liner which incorporates a radiopaque material.

BACKGROUND ART

Solid propellant rocket motors are utilized for propelling various missiles and aerospace vehicles including the space shuttle and Titan launch vehicle. These rocket motors include a motor case which surrounds a solid propellant having a star or other shaped hollow core which defines a combustion chamber, an igniter assembly, which is usually mounted on top of the propellant, and a bottom mounted nozzle assembly. The igniter assembly initiates burning of the propellant generating hot combustion gases which travel through the core, initiating combustion along the exposed propellant surfaces. The propellant then burns radially towards the motor case, generating additional hot gases which exit through the nozzle assembly, thereby providing forward thrust.

The motor case that contains the propellant is generally made of a high strength material, such as steel or fiber reinforced composite. An insulator, which usually comprises one or more layers of a rubber material bonded to the case wall, prevents excessive heating and possible burn-through of the casing during operation. Generally, a liquified formulation is added to the insulator surface and partially cured, forming a thin liner which enhances bonding of the propellant to the insulator. The liquified propellant mixture is then prepared and poured into the motor case, contacting the semi-cured liner, with the propellant and liner then processed to effect a final cure, thereby firmly bonding the propellant to the liner and the liner to the insulated motor case. It is essential that the propellant be properly bonded to the case to prevent movement of the propellant during burning. Such movement could result in loose propellant clogging the discharge nozzle, resulting in failure of the engine. It is also imperative that no disbonds or voids occur in the propellant liner interface. Such imperfections may result in the propagation of cracks in the propellant as the motor is stressed during operation, which could provide additional burning surfaces, resulting in an unregulated increase in operating chamber pressure and possible engine failure.

Because of the potential catastrophic results, extensive non-destructive testing is done on solid propellant rocket motors to determine if any such imperfections exist. X-ray analysis of selected surfaces of the rocket motor are generally the preferred method of testing. Generally, an X-ray beam is transmitted through the rocket motor where it is variably absorbed, depending on the thickness, density and composition of the insulator/liner/propellant. Since the thickness is indeterminate after bonding and the chemical compositions are essentially equivalent, density differences provide the basis for analysis.

In particular, computed tomography is an especially preferred method of inspection which involves preparing numerous thin cross-sectional X-ray slices of the engine which are evaluated by a computer. Such an inspection method eliminates the superimposition of features that may tend to distort images and obscure critical faults. However, even utilizing computed tomography, it is difficult to observe the propellant to liner interface to assure good adhesion and bonding due to the choice of insulator material. Previously, an asbestos/nitride butyl rubber insulation material was used having a specific gravity of approximately 1.27, with most propellant mixtures having a specific gravity of approximately 1.1. In an X-ray analysis, the propellant liner interface was easily discernable. However, current insulators, which do not use asbestos, have a specific gravity of approximately 1.1. Since there is no significant density difference between the propellant, liner and insulator, the propellant liner interface cannot be easily detected during testing.

DISCLOSURE OF INVENTION

It is an object of the present invention to provide a solid propellant rocket motor liner which enhances the ability to inspect the liner propellant interface.

This and other objects of the present invention are achieved by including a radiopaque material in the liner formulation prior to the addition of the liner to the insulated case wall. A quantity of this material is uniformly blended with the other liner components in an amount sufficient to achieve a measurable density difference between the liner, insulator and propellant without detrimentally altering the burn characteristics or bonding capability of the liner. In particular, one percent by weight of tungsten powder, having a particle size up to 40 microns, is blended with other liner components and formed into a liner within the motor case of a solid propellant rocket motor. Such a liner provides an observable propellant liner interface during non-destructive testing, allowing ease of detecting critical defects without detrimentally altering the bonding or burning properties of the liner.

BEST MODE FOR CARRYING OUT THE INVENTION

Figure 1:
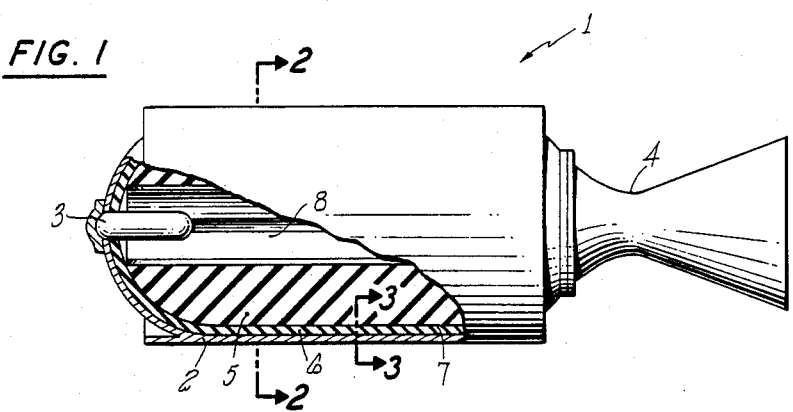
FIG. 1 is a side view of a typical solid propellant rocket motor utilizing a liner for bonding the propellant to the insulator.
Figure 2:
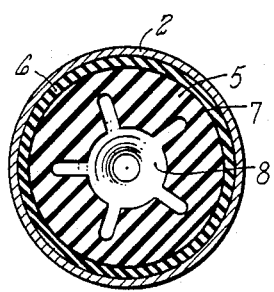
FIG. 2 is a view taken along line 2—2 of FIG. 1.

Refering to FIG. 1, a solid propellant rocket motor 1 includes a motor case 2, an igniter assembly 3, a nozzle assembly 4, and a solid propellant 5. An insulator 6 is disposed between the motor case 2 and the propellant 5 with a liner 7 forming a bonding surface for joining the insulator 6 to the propellant 5. Referring to FIG. 1, a star-shaped core 8 forms a combustion chamber which defines the initial burning surface area of the propellant.

Generally, the solid propellant incorporated in a rocket motor contains an oxidizer, such as nitrates or perchlorates, a fuel, such as organic resins or rubbers, a compound combining both fuel and oxidizer qualities, such as nitroglycerin, and various other additives to control such properties as burn rate (inhibitors/promoters), stability and storage life. A typical propellant mix may comprise polybutadiene acrylic acid acrylonitrile terpolymer as a fuel/binder, ammonium perchlorate as an oxidizer and aluminum powder as a stabilizer. Generally, such propellants have essentially the texture and consistency of rubber and can be safely handled at elevated temperatures as viscous liquids. However, such propellants are formulated to maximize the fuel-oxidizer component and minimize the binder material. Consequently, these propellants generally lack the ability to bond directly to the case wall.

A curable insulator is generally used to protect the case wall from the high temperatures encountered during the propellant burn. This insulator may include one or more layers of a rubber material, depending on the particular application, with the insulator basically formulated to be compatible with the propellant and bondable to both the liner and the case wall. In addition, the insulator must be capable of maintaining its integrity during the extreme operating conditions encountered in a rocket engine, insulating the case wall and displaying the desired burn limiting characteristics. For example, a carbon fiber/silica filled nitrile butadiene rubber may be used as an insulator.

Figure 3:
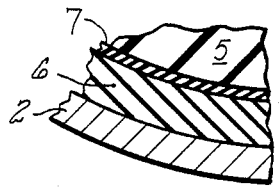
FIG. 3 is an expanded sectional view taken along line 3—3 of FIG. 1.

In order to bond the propellant to the insulator, a thin liner 7 is included between the insulator 6 and the propellant 5 (see FIG. 3), with the liner formulated to enhance bonding without altering the burn properties of the propellant or insulator. For illustrative purposes, the liner formulation may comprise a mixture of components including a liquid rubber, such as polybutadiene acrylic acid acrylonitrile (PBAN) or hydroxy terminated butadiene (HTPB), a curative, such as an isocyanate or expoxy, carbon black, and a thickener, such as silica. It will be undestood by those skilled in the art that the choice of liner formulation will vary depending on the particular application.

The liner of the present invention additionally includes a radiopaque material which is mixed and uniformly blended with the other liner components prior to coating the insulator. Radiopacity refers to the ability of the material to block the passage of X-rays. Generally, this property is dependent on atomic number, with the higher atomic number elements exhibiting higher radiopacity. Since such elements generally exhibit a correspondingly high density, for the purposes of this application, radiopacity may be considered as, directly related to density. The radiopaque material is added in an amount sufficient to provide a measureable density difference between the liner and the solid propellant without detrimentally effecting the liner's bonding or burning properties. It has been found that up to 10% by weight of a radiopaque material can be added to a liner formulation without detrimentally altering the performance characteristics of the liner, with 1 to 10% preferred. This range may be correlated to the viewing technique, with about 10% included where standard X-ray testing is done and about 1% used with computed tomography analysis. This provides a specific gravity ratio range of 1.20/1.10 and 1.11/1.10, respectively.

In a preferred embodiment of the present invention, tungsten powder is used as the radiopaque material. Tungsten has the advantage of being one of the highest density radiopaque materials available (18.7 gm/cc), having the additional advantage of being relatively inert. In an especially preferred embodiment, about 1% by weight tungsten powder, having a particle size up to 40 microns, is added to the liner components and uniformly blended therein.

The liner is installed in a rocket engine following accepted practices in the industry. One such method may involve spraying or brushing the liner formulation on the insulated case wall, and heating to obtain a partial cure, for example, in an oven at 140° F. The propellent is then loaded into the motor and the complete assembly processed to obtain a final cure. It has been found that utilizing a radiopaque material in the liner provides substantially enhanced definition of the propellent liner interface during non-destructive X-ray testing, allowing detection of flaws previously undetectable. Such an improvement in unfired non-destructive testing increases the reliability of solid propellent rocket motors by reducing the risk of catastrophic rocket failure.

While this invention has been described in relation to the use of tungsten powder as a radiopaque material, it will be understood by those skilled in the art that other radiopaque materials may also be used. For example, lead, depleted uranium, osmium or tantalum are suitable substitutes.

Having thus described the invention, what is claimed is:

1. A curable liner for a solid propellant rocket motor, said liner comprising a curable mixture of components formulated to bond a propellant to an insulator disposed within the motor, the improvement characterized by:
   a radiopaque material, uniformly blended with the uncured liner component formulation, said material added in an amount sufficient to block the passage of x-rays through the propellant-liner-insulation interface, thereby enhancing the definition of flaws during non-destructive x-ray testing, without detrimentally affecting the bonding or burning properties of the cured liner.

2. The liner of claim 1 wherein up to 10% by weight of the radiopaque material is added to the component mixture.

3. The liner of claim 1 wherein about 1% by weight of the radiopaque material is added to the component mixture.

4. The liner of claim 1 wherein said radiopaque material is from the group consisting essentially of tungsten, osmium, lead and uranium.

5. The liner of claim 4 wherein said material is tungsten in powdered form having a particle size of up to 40 microns.

6. The liner of claim 5 wherein up to 10% by weight of the tungsten powder is added to the component mixture.

7. The liner of claim 6 wherein about 1% by weight of the tungsten powder is added to the component mixture.

* * * * *